United States Patent Office 3,207,762
Patented Sept. 21, 1965

3,207,762
HYDROPEROXIDE-AMIDINE ADDITION
COMPOUNDS
Robert A. Braun, Newark, Del., assignor to E. I. du Pont
de Nemours and Company, Wilmington, Del., a corporation of Delaware
No Drawing. Filed Sept. 18, 1962, Ser. No. 224,549
7 Claims. (Cl. 260—309.7)

This invention relates to a new class of molecular addition compounds. It particularly relates to the molecular addition compounds resulting from combining certain class of organic hydroxy and hydroperoxy compounds with 1-N-substituted amidines. It further relates to a process for preparing these amidine-derived molecular addition compounds.

The molecular addition compounds of this invention are represented by the following structural formulas:

(1–a)          K.R
(1–b)          K.R'.K where K is selected from the class of 1-N-substituted amidine compounds having the following structural formulas:

(2)
$$HN=\overset{R^4}{\underset{}{C}}-N\diagdown_{R^2}^{R^3}$$

(3)
$$HN=C\diagdown_{N\diagdown R^2}^{\overset{R^2}{\underset{}{N}}\diagup R^5}$$

R is selected from the class consisting of
(a) Polyhalo secondary and tertiary carbinols having at least one perhalo radical attached to the 1 carbon atom thereof, said perhalo radical selected from the group consisting of trichloromethyl, chlorodifluoromethyl, dichlorofluoromethyl and pentafluoroethyl.
(b) Tertiary hydrocarbyl hydroperoxides selected from the group consisting of $C_4$ to $C_{12}$ alkyl, cycloalkyl, and aralkyl hydroperoxides.

R' is selected from the class consisting of ditertiary alkylenedihydroperoxides and ditertiary aralkylenedihydroperoxides.

$R^2$ and $R^3$ are the same or different $C_1$ to $C_5$ alkyl radicals and, when combined as a single divalent radical, are selected from the class consisting of oxydiethylene and $C_3$ to $C_6$ alkylene radicals.

$R^4$ is selected from the class consisting of $C_1$ to $C_5$ alkoxy, $C_1$ to $C_3$ dialkylamino- $C_2$ to $C_4$ alkoxy, —$NHR^2$, and $$-\underset{R^3}{\overset{}{N}}-R^2$$

where $R^2$ and $R^3$ are as before defined.
$R^5$ is a $C_2$ to $C_4$ alkylene radical.
In the above structures, the 1-N-substituted amidine moiety held in common is shown by (4) 

The term 1-N-substituted amidine moiety is used herein generically and includes several classes of compounds which, though not conventionally considered as being amidines, contain this structural moiety in common. These other classes of compounds are alkyl substituted guanidines, isoureas, 1-heterocyclic methyleneimines, 2-iminoimidazolidines, 2-iminohexahydropyrimidines and 2-imino-1,3-diazacycloheptanes.

The compounds of this invention are preapared by bringing a hyroxy or hydroperoxy compound R or R' in contact with a 1-N-substituted amidine compound K in equinormal, i.e., chemical equivalent quantities in organic solution at a temperature of about —10° to 40° C. and preferably in the substantial absence of water or carbon dioxide. The reaction is exothermic, the temperature and rate being controlled by the rate of addition of the reactants. Preferred solvents media are anhydrous ethers or hydrocarbons boiling below 100° C. and the products are preferably isolated by gentle evaporation of the solvent under vacuum to avoid decomposition, especially of the hydroperoxy adduct.

The molecular addition compounds of this invention are useful for two basic purposes:

(a) The perhalo hydroxy compound adducts are primarily useful as oxidation or air dry accelerators in combination with siccative metals for coating compositions. They are particularly useful with those air drying coating compositions based on vinyl dioxolane esters, though they are also useful in alkyd resin, linseed oil and similar air drying vehicles well known in the art.

(b) The hydroperoxy compound adducts are primarily useful as polymerization initiators with ethylenic type monomers. They are particularly useful alone or in combination with siccative metals as initiators for casting and adhesive compositions, such as polymer syrup compositions based upon esters of acrylic acid.

The term "molecular addition compound" is used synonymously with "adduct" in this specification and denotes a type of chemical compound formed by the bonding of two different but complete molecules to form a new and distinct form of matter. These molecular addition compounds or adducts are not simply mechanical or physical blends of the two components but are chemical compounds in the recognized sense as evidenced by several accepted criteria. First, mixtures of the components are exothermic upon initial blending. Second, the adducts are in most cases isolatable materials having discrete and narrow melting or boiling points. Third, spectral analysis, i.e., infrared and nuclear magnetic resonance, support the existance of a new and discrete form of matter and suggests that the adduts are hydrogen bonded heterocyclic complexes represented by the following formulas:

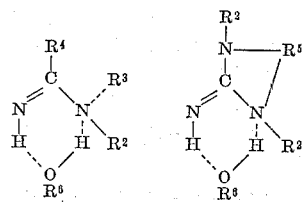

In these formuals, the hydrogen bonding is represented by dotted lines, and the conventional covalent bonding by the solid lines. $R_2$, $R_3$, $R_4$ and $R_5$ have the significance already designated. $R_6$ is equivalent to R and R' devoid of its hydroxyl group. Inasmuch as the bonding structure of these molecular addition compounds has not been rigorously established, the convention shown in formulas 1–a and 1–b has been adopted herein to designate these compounds.

Considering the various moieties of these adducts, the

R portion represents polyhalo secondary and tertiary carbinols, such as:

Bis-dichlorofluoromethyl carbinol
Bis-chlorodifluoromethyl carbinol
Bis-difluoromethyl carbinol
Bis-trichloromethyl carbinol
Bis-trifluoromethyl carbinol
Bis-pentafluoroethyl carbinol Related asymmetrical secondary and tertiary carbinols are also used with various combinations of the above listed fluoroalkyl radicals attached to the carbinol carbon. The secondary carbinols are prepared by the reduction of the corresponding ketones by conventional reducing agents, such as $LiAlH_4$ or catalytic hydrogenation.

The R portion of these adducts can also be $C_4$ to $C_{12}$ tertiary hydrocarbyl hydroperoxides, such as:

Tertiary butyl hydroperoxide
Tertiary amyl hydroperoxide
Tertiary hexyl hydroperoxide
Tertiary heptyl hydroperoxide
Tertiary octyl hydroperoxide
1-methylcyclohexyl hydroperoxide
1-ethylcyclohexyl hydroperoxide
1-phenylcyclohexyl hydroperoxide
$\alpha,\alpha$-Dimethylbenzyl hydroperoxide
$\alpha,\alpha$-Diethylbenzyl hydroperoxide
1-methyl-1-cyclohexylethyl hydroperoxide
1-ethyl-1-cyclohexyl propyl hydroperoxide Other related combinations of alkyl, aryl and cycloalkyl radicals will occur to those skilled in the art to form examples of the required tertiary hydroperoxides.

The R' category is selected from ditertiary alkylene dihydroperoxide compounds, such as:

1,1,4,4-tetramethylbutylene-1,4-dihydroperoxide
1,1,6,6-tetramethylhexylene-1,6-dihydroperoxide
p-Phenylene-bis-isopropylidene hydroperoxide
m-Phenylene-bis-isopropylidene hydroperoxide The radicals of the $R^2$ and $R^3$ categories are the $C_1$ to $C_5$ alkyl including methyl, ethyl, propyl, butyl and amyl. The $R^2$ and $R^3$ radicals can be combined to provide a divalent moiety, such as $C_3$ to $C_6$ alkylene radicals, for example, oxydiethylene, trimethylene, tetramethylene, pentamethylene and hexamethylene forming with the N' and $N^3$ nitrogen atoms such heterocyclic radicals as morpholino, pyrrolidino, piperidino and azepano.

Radicals of the $R^4$ category include (a) the ether radicals methoxy, ethoxy, propoxy, butoxy, amyloxy, and (b) the aminoether radicals methyl, ethyl and propyl-dialkyl N-substituted aminoethoxy, aminopropoxy and aminobutoxy, which in combination with the 1-N-substituted amidine moiety (4) form compounds conventionally designated as the isoureas. Further, $R^4$ can be the amino radicals —$NHR^2$ or

where $R^2$ and $R^3$ have the significance already described. Where $R^2$ and $R^3$ are individual radicals, these latter defined $R^4$ radicals form with the 1-N-substituted amidine moiety (4), compounds conventionally designated tri and tetra substituted guanidines. Where $R^2$ and $R^3$ are combined, the corresponding compounds are designated alternatively 1-heterocyclomethyleneimines.

Radicals of the $R^5$ category, specifically the ethylene, trimethylene and tetramethylene radicals when associated with an alkylimino radical and a 1-N-substituted amidine moiety (4) form heterocyclic compounds recognized as the 2-iminoimidazolidines, the 2-iminohexahydropyrimidines and the 2-imino-1,3-diazacycloheptanes.

The following examples serve to illustrate this invention.

*Example I*

In a glass vessel fitted for stirring, heating and refluxing was placed 46.5 parts (0.516 mol) of t-butylhydroperoxide dissolved in about 300 parts of anhydrous ether and 100 parts of anhydrous magnesium sulfate. To this was added slowly over a period of about one hour with stirring 57.5 parts (0.5 mole) of tetramethyl guanidine (TMG) dissolved in about 70 parts of anhydrous ether. The reaction was exothermic and maintained at 30–35° C. After stirring for an additional three hours and cooling to room temperature the mixture was filtered and the filtrate vacuum stripped of ether at 25° C. and 10 mm. Hg. It was then fractionated at 53–54° C. at 2 mm. Hg. The distillate was a colorless, liquid which was stable at 0° C. but decomposed slowly at 10° to 15° C., leaving a white crystalline residue. Infrared and nuclear magnetic resonance spectral analyses and elemental analysis identified the product as the 1:1 adduct of TMG and t-butyl-hydroperoxide of the type shown in Formula 1–a above where $R^4$ is dimethyl amino, $R^2$ and $R^3$ are methyl and R is t-butoxy.

|        | Percent C | Percent H | Percent N | Percent O |
|--------|-----------|-----------|-----------|-----------|
| Theory | 52.65     | 11.35     | 20.47     | 15.59     |
| Found  | 53.10     | 11.54     | 21.49     | 15.81     |

*Example II*

Using the equipment of Example I, 23 parts (0.2 mol) TMG dissolved in 70 parts anhydrous ether was added over a period of an hour with stirring to a mixture of 17.8 parts (0.10 mol) of 2,5-dimethylhexane-2,5-dihydroperoxide dissolved in about 140 parts anhydrous ether. The mixture was then warmed to 30° C. for four hours, then to 40° C. for one hour. The vessel was then evacuated and the ether stripped out at 0.1 mm. Hg and 30° C. to yield a colorless slightly viscous liquid. The product was identified by elemental and infrared spectral analyses as the bis tetramethylguanidine adduct of dimethylhexane-dihydroperoxide.

|        | Percent C | Percent H | Percent N |
|--------|-----------|-----------|-----------|
| Theory | 52.91     | 10.85     | 20.57     |
| Found  | 53.40     | 10.96     | 20.41     |

*Example III*

Example II was repeated adding 8.9 parts (0.0768 mol) of TMG (dissolved in about 30 parts of anhydrous ether) slowly to 86.7 parts of a 10% solution of m-diisopropylbenzene dihydroperoxide (0.0384 mol) in methyl isobutyl ketone. After the reaction was completed, the solvent was stripped off at 0.1 mm. Hg and 30° C. to leave a very viscous liquid identified by infrared spectral and elemental analyses as the bis tetramethylguanidine adduct of m-diisopropylbenzene dihydroperoxide.

|        | Percent C | Percent H | Percent N |
|--------|-----------|-----------|-----------|
| Theory | 57.86     | 9.71      | 18.41     |
| Found  | 59.07     | 9.75      | 17.47     |

*Example IV*

Example I was repeated using 0.5 mol of 1,3-dimethyl-2-iminoimidazolidine to replace the TMG. A slightly viscous liquid 1:1 adduct of t-butylhydroperoxide with 1,3-dimethyl-2-iminoimidazolidine resulted. Similar results are obtained by replacing the above imidazoline reactant with 0.5 mol of 2-iminohexahydropyrimidine yielding the analogous adduct.

Example V

Example I was repeated replacing the TMG by 0.5 mol of 1,1-dipyrrolidinomethyleneimine. A slightly viscous liquid 1:1 adduct of t-butylhydroperoxide and 1,1-dipyrrolidinomethyleneimine resulted. Similar results are obtained replacing the 1,1-dipyrrolidinomethyleneimine above with 0.5 mol amount of 1,1-dimorpholmomethyleneimine or with 1,1-dipiperidinomethyleneimine yielding respectively the analogous liquid analogues.

Example VI

Example I was repeated replacing the TMG by 0.5 mol of dimethylaminoethoxy - N,N - dimethylcarboxamidine. A slightly viscous liquid 1:1 adduct of t-butylhydroperoxide and the dimethylaminoethoxy-N,N-dimethylcarboxamidine resulted.

Example VII

Using the equipment and procedure of Example I, 22.7 parts (0.196 mol) of TMG dissolved in about 35 parts of anhydrous ether was added to a solution of 1,1,1,3,3,3-hexafluoro - 2 - phenyl - 2 - propanol 48 parts (0.196 mol) in 175 parts of anhydrous ether. The mixture warmed to about 31° C. and then was heated to reflux for four hours. The clear solution was stripped of ether at 10 mm. Hg and 30° C. yielding a white crystalline solid having a melting point of about 72–73° C. Infrared and NMR spectral and elemental analyses identified the product as the 1:1 adduct of tetramethyl guanidine and 1,1,1,3,3,3-hexafluoro-2-phenyl-2-propanol. The product was very soluble in water, acetone, methanol, ether and ethyl acetate. Elemental analysis showed:

|        | Percent C | Percent H | Percent N | Percent F |
|--------|-----------|-----------|-----------|-----------|
| Theory | 46.80     | 5.33      | 11.69     | 31.73     |
| Found  | 47.16     | 5.43      | 11.78     | 30.69     |

The fluorinated propanol above was prepared by the reaction of benzene with hexafluoroacetone using a catalyst such as Friedel-Crafts type.

The product of Example VII, 0.5 part, was mixed, along with 0.05 part of cobalt (as the butyl phthalate) into 100 parts of a vinyl cyclic acetal coating composition and coated 2 mils thick on a metal panel. The coating air dried tack free in about four hours versus eight hours for a similar control coating made without the product of Example VII.

Example VIII

Example I was repeated in which 12.8 parts (0.111 mol) of TMG was dissolved in about 40 parts of anhydrous ether added to 36.9 parts (0.111 mol) of 1H,3H,7H-dodecofluoroheptan-3-ol, dissolved in about 150 parts of anhydrous ether, replacing the t-butyl hydroperoxide. The reaction was exothermic, rising rapidly to about 60° C. and a water bath was used to control the temperature to 40°±5° C. for about one hour and then at 30° C. for one hour. After stripping the ether at 30° C. and 0.1 mm. Hg a pale yellow liquid residue was left. Infrared spectra and elemental analysis identified the product as the 1:1 adduct of tetramethyl guanidine with 1H,3H,7H-dodecofluoroheptan-3-ol.

|        | Percent C | Percent H | Percent F | Percent N |
|--------|-----------|-----------|-----------|-----------|
| Theory | 32.22     | 3.83      | 50.97     | 9.39      |
| Found  | 32.18     | 4.01      | 49.73     | 9.52      |

The product of Example VIII 0.5 part was mixed along with 0.05 part of cobalt (as the cobalt butyl phthalate) into 100 parts of a vinyl cyclic acetal coating composition and coated about 2 mils thick on a metal panel. The coating air dried free in about four hours versus about eight hours required for a similar control coating made without the product of Example VIII.

A repeat of Example VIII using, 1,1,3,3-tetrachlor-1,3-difluoroisopropanol (0.111 mol) in place of the fluoroheptan-3-ol above yields the 1:1 adduct of t-butyl hydroperoxide and 1,1,3,3-tetrachlor-1,3-difluoroisopropanol.

EXAMPLE IX

Example I was repeated adding 27.0 parts of t-butylhydroperoxide dissolved in 35 parts of anhydrous ether to 30 parts of trimethylguanidine dissolved in 70 parts of anhydrous ether. A clear slightly viscous liquid product resulted identified as the 1:1 adduct of trimethylguanidine and t-butylhydroperoxide.

EXAMPLE X

The polymerizing activities of the complexes of this invention were evaluated separately by mixing 0.5 part (2.4%) of each of the adducts of Examples I–IX respectively with separate 20 part portions of hydroxypropylacrylate monomer. Each of the adducts catalysed solid polymer at 25° C. in 30 minutes or less. These products, such as that of Example IX, similarly rapidly polymerized monomers such as polyethyleneglycol-300 diacrylate, dodecofluoroheptyl acrylate, and cyclohexyl acrylate.

I claim:

1. A molecular addition compound produced by bringing a 1-N-substituted amidine selected from the group consisting of those having the structural formulae

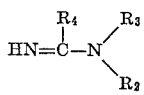

and

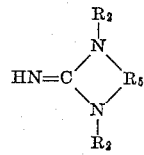

where $R_2$ and $R_3$ are $C_1$–$C_5$ alkyl, and when combined as a single divalent radical are selected from the class consisting of oxydiethylene and $C_3$–$C_6$ alkylene;

$R_4$ is selected from the class consisting of $C_1$–$C_5$ alkoxy, $C_1$–$C_3$ dialkylamino- $C_2$–$C_4$ alkoxy, —$NHR_2$ and

(where $R_2$ and $R_3$ are as before defined), and $R_5$ is $C_2$–$C_4$ alklene, into contact with an equinormal quantity of a compound selected from the class consisting of (a) a carbinol selected from the class consisting of bis dichlorofluoromethyl carbinol, bis chlorodifluoromethyl carbinol, bis difluoromethyl carbinol, bis trichloromethyl carbinol, bis trifluoromethyl carbinol, bis pentafluoro-ethyl carbinol and 1,1,1,3,3,3,-hexafluoro-2-phenyl-2-propanol;

(b) a tertiary hydroperoxide selected from the class consisting of $C_4$–$C_{12}$ alkyl-, $C_4$–$C_{12}$ cycloalkyl- and $C_8$–$C_{12}$ benzyl hydroperoxides, ditertiary $C_3$–$C_6$ alkylene- and ditertiary phenylene-bis-alkylene dihydroperoxides, in an organic liquid, at a temperature of about −10° C. to about +40°C., until formation of said addition compound is complete, and then removing said addition compound from the reaction mass.

2. A molecular addition compound produced by bringing tetramethyl guanidine into contact with an equinormal quantity of tertiary butyl hydroperoxide, in an organic liquid at a temperature of about −10° C. to about +40°

C., until formation of said addition compound is complete, and then removing said addition compound from the reaction mass.

3. A molecular addition compound produced by bringing tetramethyl guanidine into contact with an equinormal quantity of 2,5-dimethylhexylene-dihydroperoxide-2,5 in an organic liquid at a temperature of about −10° C. to about +40°C., until formation of said addition compound is complete, and then removing said addition compound from the reaction mass.

4. A molecular addition compound produced by bringing tetramethyl guanidine into contact with an equinormal quantity of propyl benzene dihydroperoxide in an organic liquid at a temperature of about −10° C. to about +40° C., until formation of said addition compound is complete, and then removing said addition compound from the reaction mass.

5. A molecular addition compound produced by bringing 1,3-dimethyl-2-iminoimidazolidine into contact with an equinormal quantity of tertiary butyl hydroperoxide in an organic liquid at a temperature of about −10°C. to about +40° C., until formation of said addition compound is complete, and then removing said addition compound from the reaction mass.

6. A molecular addition compound produced by bringing 1,1-dipyrrolidinemethyleneimine into contact with an equinormal quantity of tertiary butyl hydroperoxide in an organic liquid at a temperature of about −10°C. to about +40° C., until formation of said addition compound is complete, and then removing said addition compound from the reaction mass.

7. A molecular addition compound produced by bringing dimethylaminoethoxy-N,N-dimethylcarboxamidine into contact with an equinormal quantity of tertiary butyl hydroperoxide in an organic liquid at a temperature of about −10°C. to about +40°C., until formation of said addition compound is complete, and then removing said addition compound from the reaction mass.

References Cited by the Examiner

UNITED STATES PATENTS

| | | | |
|---|---|---|---|
| 2,703,816 | 3/55 | Emerson et al. | 260—584 |
| 3,029,236 | 4/62 | Staeuble et al. | 260—249.5 |

OTHER REFERENCES

Kharasch et al.: Jour. Org. Chem., volume 23, pages 324–5 (1958).

Kharasch et al.: Jour. Org. Chem., volume 24, pages 72–78 (1959)

WALTER A. MODANCE, *Primary Examiner.*

NICHOLAS S. RIZZO, *Examiner.*